US010735168B2

(12) United States Patent
Chaabane et al.

(10) Patent No.: US 10,735,168 B2
(45) Date of Patent: Aug. 4, 2020

(54) METHOD AND INTERROGATION DEVICE FOR INTERROGATING DATA FROM A PASSIVE ELEMENT

(71) Applicant: PRO-MICRON GMBH & CO. KG, Kaufbeuren (DE)

(72) Inventors: Malek Chaabane, Munich (DE); André Wiedbrauk, Landsberg (DE)

(73) Assignee: Pro-Micron GmbH & Co. KG, Kaufbeuren (DE)

( * ) Notice: Subject to any disclaimer, the term of this patent is extended or adjusted under 35 U.S.C. 154(b) by 239 days.

(21) Appl. No.: 15/350,613

(22) Filed: Nov. 14, 2016

(65) Prior Publication Data

US 2017/0149545 A1    May 25, 2017

(30) Foreign Application Priority Data

Nov. 20, 2015   (EP) ..................... 15195540

(51) Int. Cl.
*H04L 5/00*     (2006.01)
*G06K 7/10*     (2006.01)
*H04W 72/04*    (2009.01)

(52) U.S. Cl.
CPC .............. *H04L 5/0053* (2013.01); *G06K 7/10* (2013.01); *G06K 7/10009* (2013.01); *G06K 7/10306* (2013.01); *H04W 72/0453* (2013.01)

(58) Field of Classification Search
None
See application file for complete search history.

(56) References Cited

U.S. PATENT DOCUMENTS

| 5,721,756 A * | 2/1998 | Liebetreu ................. H04L 1/20 375/344 |
| 6,868,073 B1 * | 3/2005 | Carrender ............... G01S 13/84 340/572.1 |

(Continued)

FOREIGN PATENT DOCUMENTS

DE    602 03 805 T2    1/2006

OTHER PUBLICATIONS

Stelzer, Andreas, Stefan Schuster, and Stefan Scheiblhofer. "Read-out Unit for Wireless SAW Sensors and ID-Tags."

*Primary Examiner* — Gregory B Sefcheck
*Assistant Examiner* — Suk Jin Kang
(74) *Attorney, Agent, or Firm* — Sand, Sebolt & Wernow Co., LPA

(57) ABSTRACT

A method for wireless interrogation of data from a passive element. A first high frequency signal sent to the element excites the element to transmit a response signal which is received and mixed with a reference signal in a mixer, generating a data signal. The data signal is evaluated to extract data. A second high frequency signal generated from the same frequency reference as the first frequency signal is used as a reference signal. A control signal is generated by mixing the reference and first frequency signals. The data signal is bandpass-filtered in analog form and is converted, with the control signal, to a digital signal and digital control signal which are then each bandpass-filtered in digital form. The digital data and digital control signals are correlated to form a result signal so that a digital coherence is achieved. Raw data representing the data are obtained from the result signal.

14 Claims, 4 Drawing Sheets

(56) References Cited

U.S. PATENT DOCUMENTS

| | | | | |
|---|---|---|---|---|
| 8,240,911 B1* | 8/2012 | Pfeifer | ............... | G01K 17/00 374/117 |
| 2002/0127970 A1* | 9/2002 | Martinez | ............... | G01S 13/825 455/41.2 |
| 2004/0005863 A1* | 1/2004 | Carrender | ............... | G06K 7/0008 455/41.1 |
| 2004/0085191 A1* | 5/2004 | Horwitz | ............... | G06K 7/0008 340/10.3 |
| 2004/0203478 A1* | 10/2004 | Scott | ............... | G06K 7/0008 455/70 |
| 2004/0208635 A1* | 10/2004 | Sinsky | ............... | H04B 10/505 398/183 |
| 2004/0239504 A1* | 12/2004 | Kalinin | ............... | B60C 23/0433 340/572.5 |
| 2005/0227627 A1* | 10/2005 | Cyr | ............... | H01L 24/48 455/67.11 |
| 2005/0237953 A1* | 10/2005 | Carrender | ............... | G01S 5/14 370/278 |
| 2007/0111697 A1* | 5/2007 | Bellantoni | ............... | H03D 1/2245 455/324 |
| 2007/0206701 A1* | 9/2007 | Paley | ............... | G06K 7/0008 375/295 |
| 2007/0206705 A1* | 9/2007 | Stewart | ............... | G06K 7/0008 375/316 |
| 2007/0222609 A1* | 9/2007 | Duron | ............... | G06K 7/0008 340/572.7 |
| 2008/0009258 A1* | 1/2008 | Safarian | ............... | H04B 1/525 455/307 |
| 2008/0061984 A1* | 3/2008 | Breed | ............... | G01S 13/878 340/572.7 |
| 2008/0079545 A1* | 4/2008 | McLaren | ............... | H04B 1/1027 340/10.2 |
| 2008/0252421 A1* | 10/2008 | Khannur | ............... | G06K 7/0008 340/10.1 |
| 2009/0079524 A1* | 3/2009 | Cyr | ............... | H01L 24/48 334/78 |
| 2009/0111516 A1* | 4/2009 | Rofougaran | ............... | G06K 7/0008 455/556.1 |
| 2009/0121844 A1* | 5/2009 | Repke | ............... | H04Q 9/00 340/10.42 |
| 2009/0207025 A1* | 8/2009 | Rofougaran | ............... | G06K 7/0008 340/572.1 |
| 2010/0001842 A1* | 1/2010 | Duron | ............... | G06K 7/0008 340/10.1 |
| 2010/0060423 A1* | 3/2010 | Pillai | ............... | H04Q 9/00 340/10.1 |
| 2010/0080270 A1* | 4/2010 | Chen | ............... | H03F 1/223 375/219 |
| 2010/0250170 A1* | 9/2010 | Kalinin | ............... | B60C 23/0408 702/77 |
| 2010/0271188 A1* | 10/2010 | Nysen | ............... | G01S 13/755 340/10.1 |
| 2011/0051670 A1* | 3/2011 | Safarian | ............... | H04B 1/525 370/328 |
| 2012/0019394 A1* | 1/2012 | Loi | ............... | E21B 17/006 340/856.4 |
| 2012/0146834 A1* | 6/2012 | Karr | ............... | G01S 13/325 342/47 |
| 2013/0154801 A1* | 6/2013 | O'Haire | ............... | G06K 7/10009 340/10.1 |
| 2013/0316648 A1* | 11/2013 | Rofougaran | ............... | H04W 4/18 455/41.1 |
| 2014/0043946 A1* | 2/2014 | Youngquist | ............... | G06K 7/02 367/197 |
| 2014/0091811 A1* | 4/2014 | Potyrailo | ............... | G06K 19/0717 324/602 |
| 2014/0095102 A1* | 4/2014 | Potyrailo | ............... | G01R 27/28 702/127 |
| 2014/0203914 A1* | 7/2014 | Sadr | ............... | G01S 5/12 340/10.1 |
| 2014/0247118 A1* | 9/2014 | Kovacic | ............... | G06K 19/0717 340/10.51 |
| 2015/0042456 A1* | 2/2015 | Huang | ............... | G06K 7/10366 340/10.1 |
| 2015/0130594 A1* | 5/2015 | Frederick | ............... | G06K 7/10009 340/10.2 |
| 2015/0186692 A1* | 7/2015 | Stengel | ............... | G06K 7/10009 340/10.1 |
| 2015/0207204 A1* | 7/2015 | Loi | ............... | E21B 17/006 367/81 |
| 2015/0241559 A1* | 8/2015 | Scott | ............... | G01S 5/0221 342/25 R |
| 2016/0117531 A1* | 4/2016 | Kato | ............... | G06K 7/0008 340/10.3 |
| 2016/0328637 A1* | 11/2016 | Viikari | ............... | G06K 19/0717 |
| 2017/0063404 A1* | 3/2017 | Langer | ............... | H04W 72/0453 |
| 2017/0098107 A1* | 4/2017 | Rezayee | ............... | G06K 7/10009 |
| 2017/0116442 A1* | 4/2017 | Hines | ............... | G01R 15/181 |
| 2017/0132439 A1* | 5/2017 | Nikunen | ............... | H04Q 9/00 |
| 2017/0299712 A1* | 10/2017 | Scott | ............... | G01S 5/0221 |

* cited by examiner

Translation:
1. Frequency response of analog bypass
2. Useful signal
3. Frequency response of digital bypass
4. 1/f noise

METHOD AND INTERROGATION DEVICE FOR INTERROGATING DATA FROM A PASSIVE ELEMENT

CROSS-REFERENCE TO RELATED APPLICATIONS

This application claims priority from EP 15 195 540.8, filed Nov. 20, 2015.

TECHNICAL FIELD

The invention relates to a method for wireless interrogation of data from a passive element operating according to the delay line principle (so-called "Delay Line"), in particular from such a surface wave component (so-called "SAW component") having the features of a first high frequency signal of a first frequency being sent to the element and the element being thus excited to transmit a response signal, wherein the response signal is received and mixed with a reference signal in a mixer and a data signal is generated in the process, which is evaluated for the purpose of extracting data. It also relates to an interrogation device for the wireless interrogation of data of such elements having the features of a device for generating a first high frequency signal at a first frequency, a transmission antenna connectable to the device for generating the first high frequency signal, a receiving antenna, a mixer having a first signal input and a second signal input, as well as a signal output, an A/D converter connected to the signal output, and a signal processor connected to the A/D converter.

BACKGROUND INFORMATION

Surface wave components, so-called SAW components, are currently used in a variety of technical applications. Thus, SAW components operating according to the delay line principle are used as identification elements, so-called ID tags. However, SAW sensors are also used in order to detect or to monitor various measuring parameters. Measurements that may be carried out with such SAW sensors include, in particular, temperature measurements or also pressure measurements, but also (mechanical) stress measurements and force measurements. SAW components in such case have, in general, the particular advantage that they are comparatively robust and may also be used under adverse environmental conditions such as, for example, at high temperatures.

SAW components of this type are typically wirelessly remotely interrogated. For this purpose, two fundamentally different type of components and interrogation methods are frequently used:

So-called SAW resonators are excited at a frequency, typically, several times in succession at an excitation frequency varying within one frequency band, wherein these resonators respond at a sensor-typical resonance frequency, which—when the SAW resonators are used as sensor elements—displays a dependency on the measured value to be detected with the sensor, for example, a measuring temperature, in addition to a dependency on the sensor geometry. The response signal received in return by the SAW component is evaluated with respect to its frequency position, and on the basis of this position, the measured value is deduced.

In practice, the various response signals to the excitation signals varied in the frequency band are observed in the process, wherein an actual measurement result is obtained, for example, averaged, from the various response signals.

A second type of SAW components operates according to the delay line principle, they are also referred to as "Delay line SAWs". In the case of these components, the SAW component, for example, a SAW sensor, emits a response at the same frequency, as that of the excitation signal, the information about the data transmitted back by the SAW component is contained in the time delay of the response signal relative to the excitation, the so-called "delay". This delay may, for example, simply express an identification, is modified when such SAW components are used as SAW sensors depending on the state of the observed parameters, for example, depending on the temperature to be detected by such a SAW sensor. The aim is to determine and evaluate this delay accordingly.

SAW components that operate according to the delay line principle are currently read out, inter alia, using a method in which a high frequency signal, for example, a signal having a frequency in the range of 2.4 to 2.5 GHz, in particular, having a frequency from the range of 2.4 to 2.4835 GHz, is emitted as a signal pulse for exciting the SAW component, a response signal pulse of the SAW component is received, this response signal of the SAW component is mixed in a mixer with a high frequency signal originating from a local oscillator (LO), as it is also supplied for the signal pulse of the excitation, and the output signal of the mixer, which is actually a direct current signal, is evaluated to determine a piece of data to be read out, whether this is a simple identification or also a piece of sensor data, for example, a temperature value. Thus, a homodyne detection is accordingly used in this case. This approach is described, for example, in the article "Readout Unit for Wireless SAW Sensors and ID-Tags" by the authors Andreas Stelzer, Stefan Schuster, Stefan Scheiblhofer in "Proc. 2nd Int. Symp. Acoust. Wave Dev. for Future Mobile Comm. Syst.", (Chiba, Japan), March 2004, pages 37-44. Explanations on the reading out of SAW sensors operating according to the delay line principle are also found in DE 602 03 805 T2 in the general introduction and in the description of the prior art described therein, as well as in U.S. Pat. No. 8,240,911 B1, in particular, in FIG. 4 and in the related description.

The problem with this approach is that during this mixing of the response signal of the component and of the excitation signal, signal parts which overlay the response signal, for example, parasitic couplings of the transmission frequency into the receive path and, in addition, al/f noise signal also arriving in the receive path, likewise in fact mixed down to a 0 frequency, are thus transferred into a DC component, so that these signal parts also form part of the resultant direct current signal, which is intended to represent the measurement result. However, this parasitic contribution can no longer be eliminated from the direct current signal, such that it results in a significant measurement error. In such case, errors of several percent occur, in extreme cases up to 30%. In practice, therefore, considerable effort is made to prevent parasitic couplings of the transmission signal into the receive path on the one hand, and to suppress 1/f noise to the extent possible on the other hand. These efforts result in complex structured and, therefore, expensive reading devices, but in practice are then also not always able to prevent errors in the determination of the transmitted data.

These fundamental considerations apply, in principle, not only to SAW components, but to any other possible passive type of components or elements, which operates with a corresponding response according to the delay line principle.

SUMMARY

The object of the present invention is to remedy this problem by specifying a method and an interrogation device for wireless interrogation of data from a passive element operating according to the delay line principle, in particular, from a surface wave component, which make interrogation possible using a simplified structure of the interrogation device and, at the same time, with improved accuracy and reduced susceptibility to error.

This object is achieved according to the invention by a method for wireless interrogation of data from a passive element operating according to the delay line principle, in particular, from such a surface wave component, wherein a first high frequency signal of a first frequency is sent to the element and the element is thus excited to transmit a response signal, wherein the response signal is received and mixed with a reference signal in a mixer and a data signal is generated in the process, which is evaluated for the purpose of extracting data, characterized in that a second high frequency signal generated from the same frequency reference as the first high frequency signal at a second frequency differing from the first frequency is used as a reference signal, that a control signal is generated by mixing the first high frequency signal with the reference signal, that the data signal is bandpass-filtered in analog form, that the filtered data signal and the control signal are converted to a digital signal and a digital control signal, respectively, that the digital control signal and the digital data signal are each bandpass-filtered in digital form, that in a digital signal processing, the digital data signal and the digital control signal are correlated to form a result signal in such a way that a digital coherence is achieved, and that the raw data containing the data are obtained from the result signal. Advantageous refinements of this method include that the mixing of the first high frequency signal with the reference signal for generating the control signal takes place in the mixer, in which the response signal is also mixed with the reference signal for obtaining the data signal. The method further includes that the control signal is bandpass-filtered in analog form before being converted to a digital control signal. Still further, the data signal and the control signal are digitalized one after the other via one and the same A/D converter and are fed to the digital signal processing, wherein in the digital signal processing, at least one of the digital signals is buffered. In the method, one and the same antenna is used for sending the first high frequency signal for receiving the response signal, wherein the sending and receiving occur one after the other and the antenna is switched accordingly. For interrogating a piece of data, a series of first high frequency signals is transmitted in succession, wherein the first frequency of the first high frequency signals is modified for each transmission process or after a predefined number of transmission processes, wherein forming the control signal for evaluating a data signal generated with a response signal obtained in the respective transmission process, the first high frequency signal at the first frequency instantaneously adjusted for the transmission process is mixed with the reference signal. Parallel to the change of the first frequency of the first high frequency signal in the series of the first high frequency signals, the second frequency of the second high frequency signals is also changed in such a way that a bandpass filter having a fixed characteristic may be used for the analog bandpass-filtering of the analog data signal. With respect to a novel interrogation device, the solution to the above referenced problem is found in such a device for wireless interrogation of data from a passive element operating according to the delay line principle, including a device for generating a first high frequency signal at a first frequency, a transmission antenna connectable to the device for generating the first high frequency signal, a receiving antenna, a mixer having a first signal input and a second signal input, as well as a signal output, an A/D converter connected to the signal output, and a signal processor connected to the A/D converter, characterized by a device for generating a reference signal in the form of a second high frequency signal from the same frequency reference, on which the first high frequency signal is also based, and at a second frequency differing from the first frequency, wherein the first signal input of the mixer is connected to the device for generating the reference signal, and wherein the second signal input is selectively connectable to the receiving antenna or to the device for generating the first high frequency signal, and wherein the signal processor is configured to store signals digitalized with the A/D converter and to correlate different digital signals in such a way that a digital coherence is established, and wherein the signal processor is further configured to read out data of the element once a digital coherence of the signals thus correlated is established based on a digital mixed signal thus obtained. Advantageous refinements of such an interrogation device include that a power splitter is connected to the device for generating the first high frequency signal, which includes two outputs, a first of which is connectable to the transmission antenna and a second of which is connectable to the second signal input of the mixer. The transmission antenna and the receiving antenna are formed by a single transceiver antenna, which is selectively connectable via a switch to the device for generating the first high frequency signal or to the second signal input of the mixer. The interrogation device further includes a timing element, which presets the recording time of the control signal identically to the receiving time of the sensor signal.

In the method according to the invention for wireless interrogation of data from a passive element operating according to the delay line principle, in particular, from such a surface wave component, a first high frequency signal of a first frequency—as in the approach according to the prior art—is sent to the element and the element is thus excited for the purpose of emitting a response signal. The response signal, also as in the prior art, is received and mixed in a mixer with a reference signal and, in the process, a data signal is generated, which is evaluated for the purpose of extracting raw data. The first high frequency signal in this case is sent to the element as a frequency pulse. The frequency in such case may be in a range between 2.4 GHz and 2.4385 GHz, wherein the bandwidth of the signal materializes as a result of the switching on and off of the signal, and may lie in the range of approximately 100 kHz and approximately 2 MHz. The pulse length of the first high frequency signal is typically selected in such a way that a transient oscillating state occurs. Once this transient oscillating state is produced, the transmission process may be switched off. "Transient oscillation" in this context means that the responses of the reflectors on the SAW component or other element arrive on the element stacked according to their position. In the transient oscillating state all responses have arrived. Typical pulse lengths may be in the range of several µs. This prevents the sending of the high frequency signal and the receiving of the response signal from occurring at the same time and, in the process, an overlay of the first high frequency signal with the response signal.

Whereas the reference signal in the prior art corresponds to the first high frequency signal, according to the invention, a second high frequency signal is used as the reference signal, which is generated from the same frequency reference and at a frequency differing from the first frequency. In this way, no data signal essentially down mixed to the zero frequency and representing a direct current signal, but rather an additional intermediate frequency signal, is generated as a result of mixing the response signal of the element, which has the same frequency as the first high frequency signal, with the reference signal. The second high frequency signal is typically generated from a local oscillator (LO), which is fed by the same frequency reference as the local oscillator, from which the first high frequency signal originates. The frequency of the second high frequency signal in this case may be approximately 4 to 6 MHz above or below the frequency of the first high frequency signal. The fact that the second high frequency signal does not, for example, originate from an arbitrary source, but rather is derived from the same frequency reference as the first high frequency signal is essential to the function according to the invention. Thus, only the multiplication factor and, since two separate phase locked loops, each with its own voltage control oscillator (VCO), are used, generally also the phase noise are different. An additional advantage of the implementation as described above is that the high frequency signals (from the local oscillator) are not required simultaneously for receiving the data, are thus switched on only when needed, nor do they mutually influence one another. In the case of a conventional architecture of a reading device known from the prior art on the other hand, the two high frequency signals derived from the frequency reference signal (LO signal) are identical and are consistently need and thus, can have a disruptive effect on the useful signal.

In order to then further evaluate the data signal present as the intermediate frequency signal (IF), the latter is initially bandpass-filtered in analog form and subsequently converted into a digital data signal, which typically occurs in an A/D converter. A control signal is also generated by mixing the first high frequency signal with the reference signal in the mixer. The first high frequency signal in this case corresponds by frequency and phase position to the signal, as it was sent as an interrogation pulse to the sensor. The control signal thus formed is likewise digitalized to form a digital control signal. The two signals are then bandpass-filter in digital form in order, for example, to thereby eliminate additional (even white) noise. Finally, the digital control signal and the digital data signal are correlated in a digital signal processing to form a result signal in such a way that a digital coherence (also called "pseudo-coherence") is achieved. A result signal obtained by means of this correlation and, if applicable, by subsequent additional processing, which in turn corresponds to a direct current signal, then represents the raw data received by the element. This result signal, which corresponds to a direct current signal, is advantageous in the digital signal processing due to the low frequency (ideally approaching zero). This is because no 1/f noise, no offsets, no crosstalk and no additional artefacts and disruptions observable at the relevant frequencies occur, which would hinder or distort the signal processing.

Because both the data signal generated in the mixer and the control signal generated by mixing, for example, in the same mixer, are overlaid in this approach with largely the same disruptive effects such as, for example, harmonics of the mixer or with disruptive effects generated by non-linearity of the elements and the like, these parasitic effects are equally "shortened out" in the subsequent digital processing of the digitalized signals and in the correlation to form a digital coherence (systematic effects, as caused, for example, by non-linear effects of the receiver components, are reduced to a global amplitude error to the extent they act the same for all frequencies; thus, they are still present for individual frequency points; however, then the global amplitude error is insignificant in terms of evaluation, since only amplitude ratios are consistently taken into consideration), so that the result signal obtained represents the sensor data with a much lower error. Even parasitic couplings of the transmission signal are not a problem, since the transmission signal and the receive signal have different frequencies, so that parasitic couplings and the receive signal may be separated on the basis of their varying frequencies and propagation delay. In this approach, even the cumbersome shielding measures and other measures for suppressing parasitic effects and the influence of noise otherwise required for a corresponding interrogation device may be significantly reduced (Couplings of external disruptive signals, etc., must generally nevertheless be prevented), which allows for a simpler and, therefore, more cost-effective production of the corresponding interrogation device.

A particular advantage of the solution according to the invention is that with the particular architecture and operation of the receiver, it is possible to use a bandpass filtering for the architectures and methods currently used instead of the lowpass filtering conventional in the state of the art. The useful signal may thus be much more easily separated and isolated from disruptive signals. Though not absolutely required for implementing the invention, it may also be provided to also bandpass-filter the analog control signal before it is converted to the digital control signal. In this way, the influence of the disruptive signal on the reading out of the data is reduced still further.

In one possible embodiment variant of the method, the data signal and the control signal may be digitalized one after the other via one and the same A/D converter and correspondingly supplied one after the other (serially) to the digital signal processing. In this case, an intermediate buffering of at least one of the digital signals must then take place in the digital signal processing, in particular, both digital signals may be buffered before the signals are further processed and correlated to generate the digital coherence in the digital signal processing. However, it is also possible using modern electronic components to carry out a data processing, at least a digital bandpass filtering in real time, of the digital control signal and digital data signal, without buffering the digital signals. For this purpose, so-called field programmable gate arrays (FPGAs), for example, having sufficient processing capacity and resources may be used, which are then able to compute the digital bandpass filtering in real time. If necessary, a buffering may, but need not, take place after the digital bandpass filtering of the aforementioned digital signals.

In the method, one and the same antenna may also be used in one configuration for sending the first high frequency signal and for receiving of the response signal, wherein the sending and the receiving occur one after the other and the antenna is switched accordingly. This approach has the advantage that only one antenna component must be provided. Moreover, signal attenuations are also avoided, which occur, for example, when only one of the two antennas is detuned as a result of convergence with a metal object, and this antenna has a narrowband.

As is also common-place in the currently known and conventional methods, a series of first high frequency signals may also be emitted successively in the method according to the invention for interrogating a piece of data from the element, wherein the first frequency of the high frequency signal is modified for each transmission process. To form the control signal for the evaluation of a data signal generated with a response signal obtained in the respective transmission process, the first high frequency signal at the first frequency instantaneously adjusted for the transmission process is mixed with the reference signal, in order to thereby obtain a control signal tuned to the instantaneously sent first high frequency signal.

An interrogation device according to the invention for the wireless interrogation of data from a passable element operating according to the delay time principle, as is conventional for such state of the art interrogation devices, includes the following components:

A device for generating a first high frequency signal at a first frequency,
    a transmission antenna connectable to the device for generating the first high frequency signal,
a receiving antenna,
    a mixer having a first signal input and a second signal input, as well as a signal output,
an A/D converter connected to the signal output and
a signal processor connected to the A/D converter.

The interrogation device is distinguished according to the invention by the fact that it also includes a device for generating a reference signal in the form of a second high frequency signal from the same frequency reference on which the first high frequency signal is also based, and at a second frequency differing from the first frequency. The interrogation device according to the invention is further distinguished by the fact that the first signal input of the mixer is connected to the device for generating the reference signal, that the second signal input is selectively connectable to the receiving antenna or to the device for generating the first high frequency signal, and that the signal processor is configured to store signals digitalized with the A/D converter and to correlate different digital signals in such a way that a digital coherence is established, and that the signal processor is further configured, once a digital coherence of the signals thus correlated is established based on a digital mixed signal thus obtained, to read out data transmitted from the element. The interrogation device formed in such an inventive manner implements the advantages explained above with reference to the method.

In one particular embodiment of the device, said device may include a power splitter or a comparable component such as, for example, a directional coupler or also a switch with an attenuator, which is connected to the device for generating the first high frequency signal, and which includes two outputs. A first of these outputs is connectable to the transmission antenna, a second of these outputs is connectable to the second signal input of the mixer. In this way, the first high frequency signal with substantially the same frequency and phase may be sent to the transmission antenna on the one hand and to the second signal input of the mixer on the other hand.

In another embodiment of the interrogation device according to the invention, the transmission antenna and the receiving antenna are formed by one single component, namely a transceiver antenna, which is then selectively connectable via a switch to the device for generating the first high frequency signal or to the second signal input of the mixer.

In order, also in terms of timing, to obtain a preferably similar baseline situation in the formation of the data signal on the one hand and in the formation of the control signal on the other hand, it may be provided that the interrogation device according to the invention includes a timing element which presets the transmission time of a signal pulse of the first high frequency signal to the sensor on the one hand, identically to the time in which the first high frequency signal is applied to the second signal input of the mixer on the other hand.

Although this will probably be self-evident to the person skilled in the art, it should be emphasized once again at this point that the architecture and method described above are suitable and may be carried out accordingly for purely real signal processing as well as for complex-valued signal processing.

It is, of course, possible with an interrogation device according to the invention to also address multiple elements in an interrogation environment and to interrogate data from such elements, for which the technologies and measures known from the prior art for such purposes may be used.

BRIEF DESCRIPTION OF THE SEVERAL VIEWS OF THE DRAWINGS

Additional advantages and features of the invention result from the following description of an exemplary embodiment with reference to the appended figures, in which.

DETAILED DESCRIPTION

Figure 1:
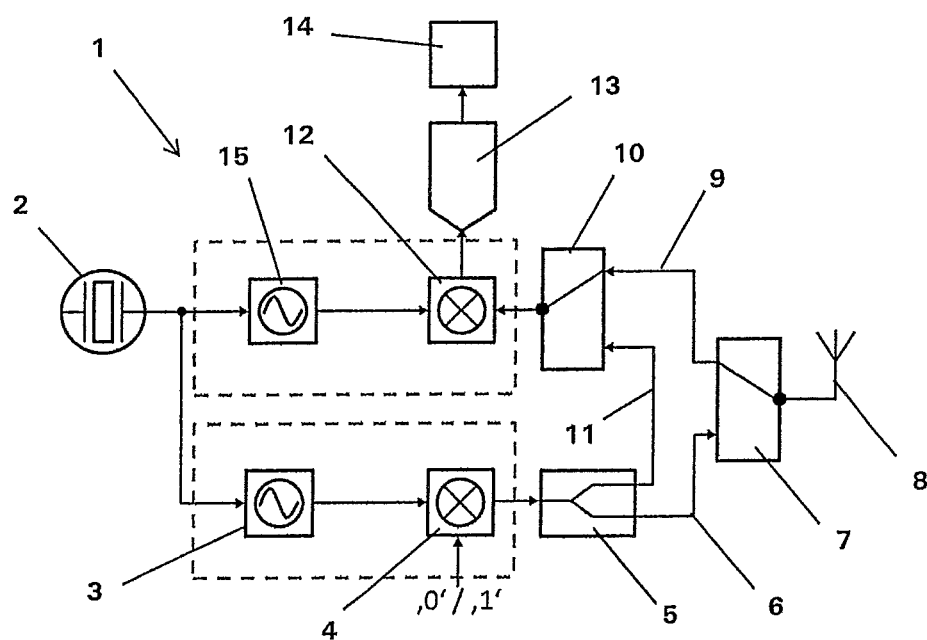
FIG. 1 shows a schematic depiction of the structure of an exemplary embodiment of an interrogation device according to the invention, which is suitable and configured for carrying out a method according to the invention.
Figure 2:
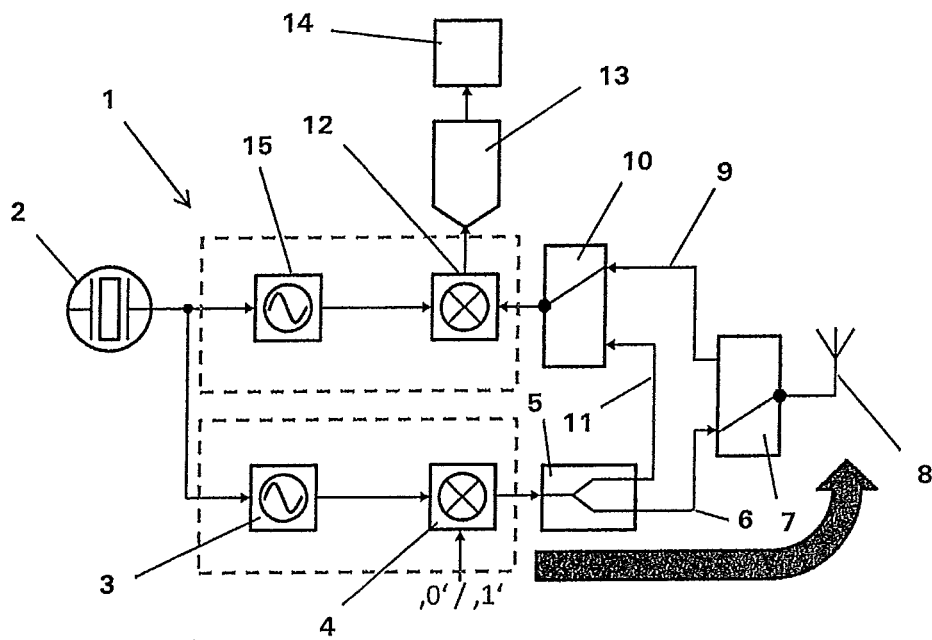
FIG. 2 shows the depiction from FIG. 1 in a first switching position of the device when sending a high frequency pulse for exciting a passive element operating according to the delay line principle, in particular, a SAW sensor.
Figure 3:
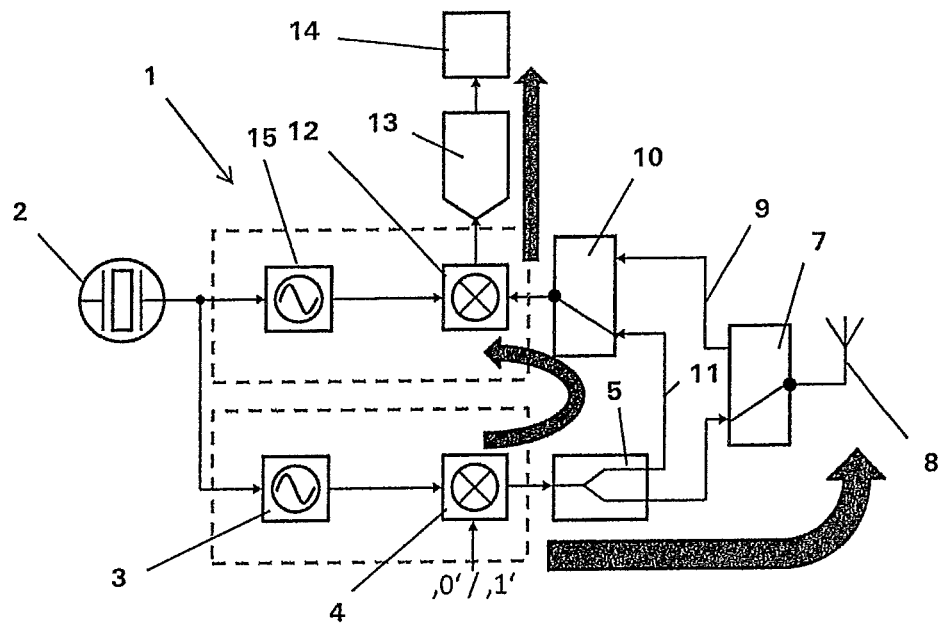
FIG. 3 shows the depiction from FIG. 1 in a second switching position, in which the high frequency pulse is also sent, but at the same time a control signal is also generated.
Figure 4:
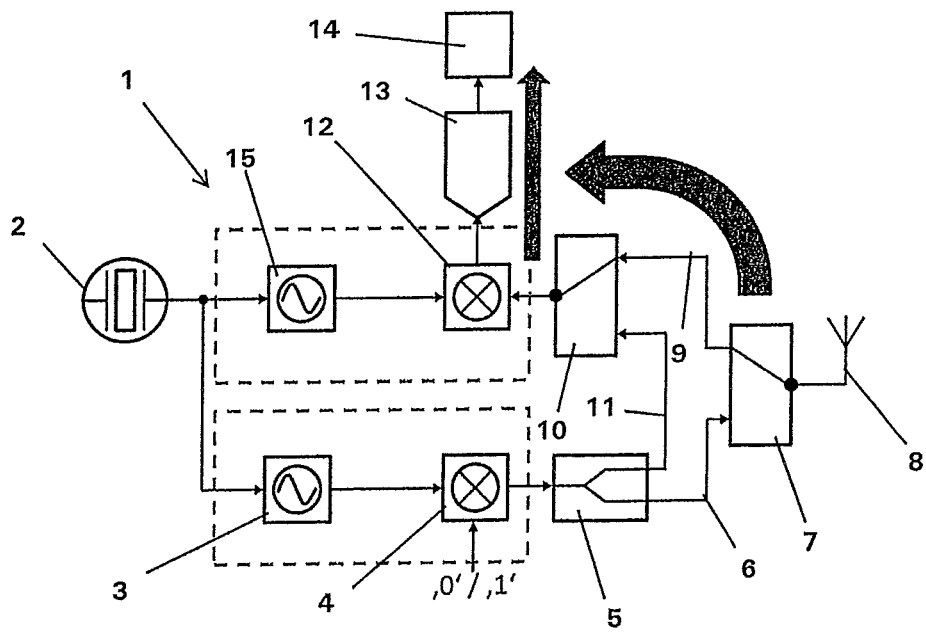
FIG. 4 shows the depiction from FIG. 1 in a switching position when receiving a response signal from the passive element, in particular, the SAW sensor.

The structure of a possible exemplary embodiment of an interrogation device according to the invention for wireless interrogation of data, in particular, sensor data from a passive element operating according to the delay line principle, in particular, a sensor, in particular, a SAW sensor, is initially schematically depicted in the figures (FIG. 1). The method sequence according to the invention is then illustrated in an exemplary embodiment with reference to switching states of such an interrogation device (FIGS. 2-4). In the figures, identical elements are provided with identical reference numerals. The figures represent purely schematic drawings, they are neither overall complete design drawings nor layout drawings, nor do they otherwise contain full details. Rather, they are intended to illustrate the essential elements of the interrogation device and the essential sequence of the method. Insofar as for the sake of simplicity, reference is made to a "sensor" in the following description, this reference is intended nonetheless to include other possible elements, which may be used within the meaning of the invention, for example, ID tags and the like. The same applies to the identification of the data to be interrogated as "sensor data", which, however, is also intended to include other types of transmitted data such as, for example, identification data or the like.

FIG. 1 schematically depicts the structure of a possible exemplary embodiment of an interrogation device according to the invention for wireless interrogation of sensor data from a passive element operating according to the delay line principle, in particular a SAW sensor, and indicated in general by the reference numeral 1. The interrogation device 1 in this exemplary embodiment initially includes a frequency source 2. This frequency source 2 is connected via an output line, inter alia, to a local oscillator 3, which serves to generate a first high frequency signal at a first frequency. The high frequency signal generated by the local oscillator 3 is fed to a power splitter 5 via an upward mixer 4, with the first input (LO input) of which the local oscillator is connected, and via the signal output (HF output) of the mixer 4. The mixer 4 is not essential for the interrogation device according to the invention and may also be omitted. It is equally of little necessity for the method according to the invention. This mixer 4 serves here merely as a switching element, which is indicated by the fact that its second signal input (ZF input) is fed with a "0" or a "1" signal. If the "0" signal is present there, then the line is switched off. If the "1" signal is applied, then the line is switched to open, the local oscillator 3 is connected to the power splitter 5.

A first signal line 6 representing an output of the power splitter 5 is connected to a first switching input of a toggle switch 7, the switching output of which leads to a transceiver antenna 8.

A second switching input of the toggle switch 7 is connected to a signal line 9, which is placed on a first switching input of another toggle switch 10. A second switching input of the toggle switch 10 is also connected to a second output of the power splitter 5 via a signal line 11. The switching output of the toggle switch 10 leads to a signal input (HF signal input) of a downward mixer 12. The signal output (ZF signal output) of the mixer 12 is placed on an A/D converter 13, which, in turn, is connected to a digital signal processor 14. A second signal input of the mixer 12 (the LO signal input) is connected to an additional local oscillator 15, which is also fed from the frequency source 2 and serves to generate a high frequency signal at a second frequency differing from the first frequency, which is used as a reference signal.

FIGS. 2 through 4 show various switching states, on the basis of which the functionality of the interrogation device depicted in this embodiment and of the method according to the invention carried out with it is explained.

In the switching position shown in FIG. 2, the signal line 6 is connected at the output of the power splitter 5 to the transceiver antenna 8 via the toggle switch 7. A transmission pulse of the high frequency signal generated by the local oscillator 3 is sent via the transceiver antenna 8 to a passive sensor element not depicted, which is indicated by the arrow depicted in FIG. 2. The mixer 12 receives merely the high frequency signal (the reference signal) supplied by the local oscillator 15 on its LO signal input, but no signal on its HF signal input since, on the one hand, the branch coming directly from the power splitter 5 is separated as a result of the switching position of the toggle switch 10, on the other hand, the transceiver antenna 8 is likewise not connected to the mixer 12 as a result of the switching position of the toggle switch 7. In this case, therefore, the first high frequency signal is transmitted as an interrogation signal without additional signals being processed.

FIG. 3 shows a switching position of the interrogation device 1, in which the toggle switch 10 is switched over as compared to the switching position shown in FIG. 2, so that the signal line 11 connects the second output of the power splitter 5 to the HF signal input of the mixer 12. In the position shown herein, the interrogation pulse is also transmitted with the first high frequency signal, which is generated by the local oscillator 3, via the transceiver antenna 8 in the direction of the sensor (indicated by the arrow also depicted in FIG. 2). At the same time, a control signal is formed in the mixer 12, by mixing the reference signal generated by the local oscillator 15 with the first high frequency signal generated by the local oscillator 3, which is also used to excite the sensor. This control signal originating from the mixer 12 is digitalized by the A/D converter 13 and is fed to the digital signal processor 14. There it is stored in a memory unit not further depicted. This is illustrated by the second arrow depicted in FIG. 3.

In FIG. 4, a switching state is shown, in which the toggle switch 7 separates the transceiver antenna 8 from the power splitter 5 and, therefore, from the high frequency signals generated by the local oscillator 3, instead connects the transceiver antenna 8 via the signal line 9 and the toggle switch 10, again in the correspondingly changed switching position compared to the position in FIG. 3, to the HF signal input of the mixer 12. In this switching position, a response signal returned via the transceiver antenna 8 is sent to the mixer 12, where this response signal, which has the frequency of the first high frequency signal generated with the local oscillator 3, is mixed with the reference signal generated by the local oscillator 15, which has a different frequency (this is illustrated by the arrows depicted in FIG. 4). The resultant signal generated in this manner (referred to here as a data signal), which, in turn, is a high frequency signal, is initially bandpass-filtered in analog form in a bandpass filter not further depicted here and then digitalized in the A/D converter 13 and fed to the digital signal processor 14. This digitalized data signal may also be stored there. Once stored, though also possible directly and without further storing, it is then bandpass filtered in digital form once again, and then correlated with the previously stored digitalized control signal, which was also previously bandpass-filtered in digital form, specifically, in such a way that a digital coherence of the two digital signals thus bandpass-filtered in digital form is achieved. The result signal thus obtained as a result of the correlation, which corresponds to a direct current signal, represents a piece of sensor data wirelessly interrogated from the sensor.

In practice, this process is repeated at multiple different frequencies of the local oscillators 3 and 15. The frequency of the local oscillators is modified in such a way that the analog bandpass filter for filtering the data signal exhibits a fixed characteristic and may be operated with such a characteristic. In this way, several, generally a large number of, measured value(s) are then obtained, from the totality of which an actual measured value is then ascertained.

FIGS. 1 through 4 depict—for the sake of better clarity—the case of purely real signals/signal processing. In practice, the method according to the invention may—and this is also preferred—also be implemented with complex-valued signal processing. The person skilled in the art will add the correspondingly additional components and switching elements accordingly. One example of a structure for the complex-valued signal processing is also shown once again in FIG. 7 and is also briefly described once again below with reference to this figure.

Figure 5:
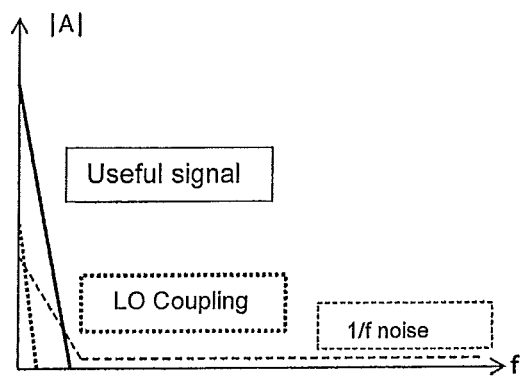
FIG. 5 shows a depiction of the frequency spectrum in an I/Q receiver according to the prior art.
Figure 6:
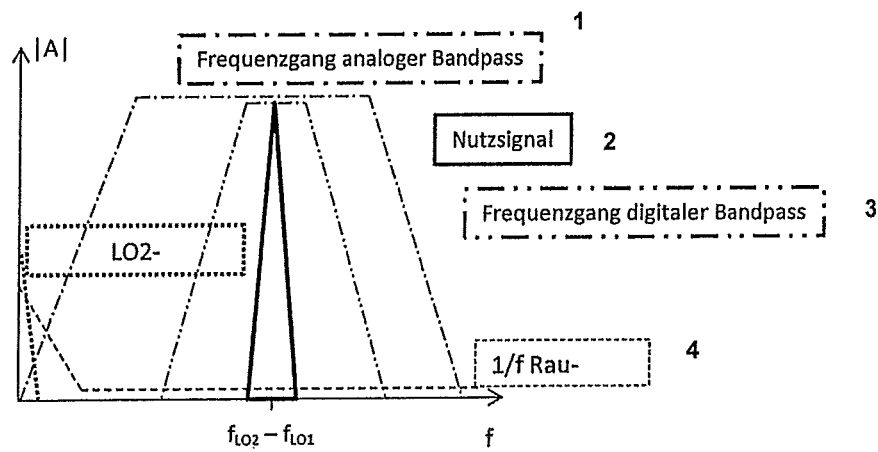
FIG. 6 shows a depiction of the frequency spectrum in the I/Q receiver during the signal processing according to the invention.

FIGS. 5 and 6—for comparing and for illustrating the operation of the method according to the invention—depict the frequency spectrum in a complex-valued operating receiver (I/Q receiver according to the prior art (FIG. 5) and according to the design according to the invention (FIG. 6). Here it is clearly apparent that in the prior art, the useful signal is overlaid by significant portions as [sic] of a coupling of the local oscillator (LO coupling) generating the interrogation signal and of the 1/f noise. These overlays distort the data embodied in the useful signal during evaluation.

In contrast, as is apparent in FIG. 6, a situation is created by the combination of various mixing processes according to the invention and of the analog and digital bandpass filtering of the type previously detailed, in which the useful signal (which is now the difference in the frequencies of the second and the first local oscillators, the frequency $f=f_{LO2}-f_{LO1}$), affected significantly less by disruptive overlays of couplings of the second local oscillator (LO2 coupling) and 1/f noise, is far more clearly and noticeably present, in this respect allowing a far less distorted evaluation of the data contained therein.

Figure 7:
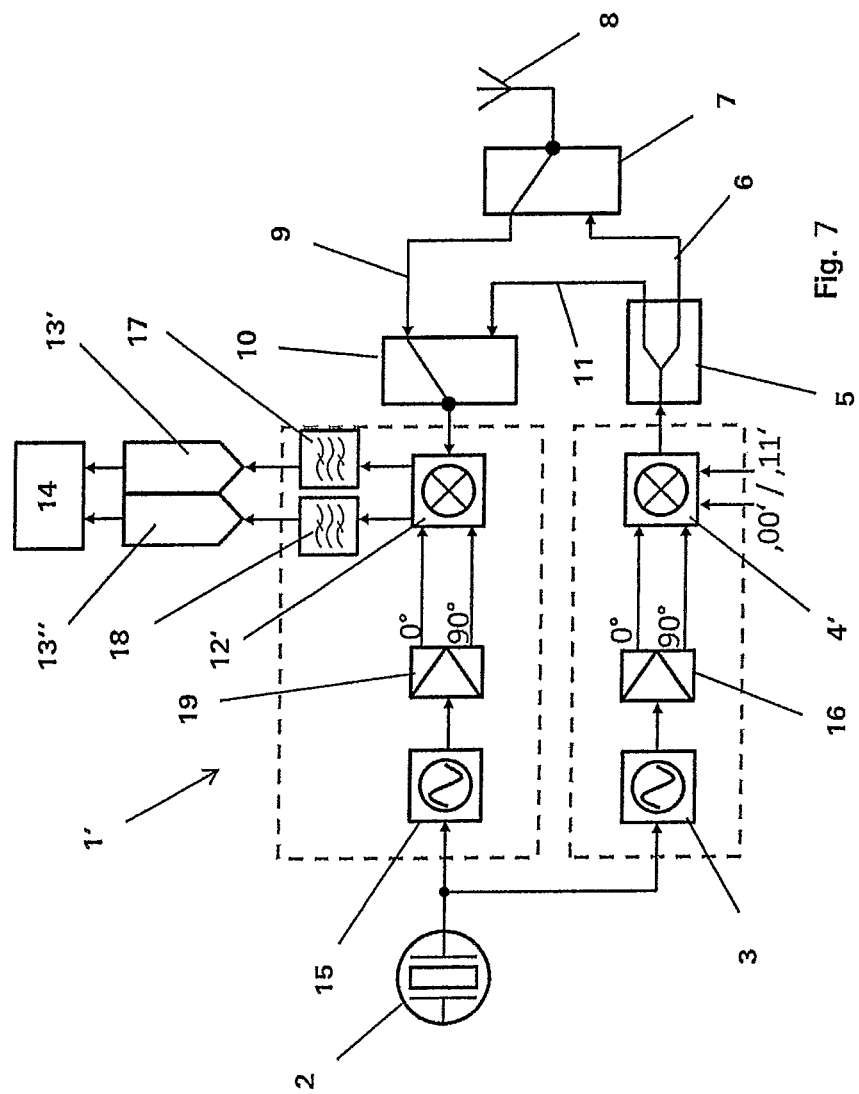
FIG. 7 shows a schematic depiction of the structure of an exemplary embodiment of an interrogation device according to the invention comparable to FIG. 1, in this case with explicit depiction of a complex-valued signal processing.

FIG. 7, as previously mentioned, shows, for the sake of completeness, a schematic diagram, which shows the structure of interrogation device 1' with complex-valued signal processing. The elements in this depiction, which are similarly included in the depiction according to FIGS. 1-4, are provided with the same reference numerals. These operate in the same manner, so that the function of these elements need only be briefly discussed.

In the structure depicted in FIG. 7 as well, a frequency source 2 is connected to two local oscillators 3 and 15. The local oscillator 3 generates a first high frequency signal, which is divided by a quadrature phase generator into two signal parts phase-shifted by 90° relative to one another, corresponding real part and imaginary part of a complex-valued signal. These two signal parts are led to an upward mixer 4', which, in turn, serves merely as a switch. From there, the signal passes to the power splitter, which is connected to the toggle switch 7 connectable to the transceiver antenna via the signal line 6, and to the additional toggle switch 10 via the signal line 11, to which the signal line 9 coming from the transceiver antenna via the toggle switch 7 also leads. The respective signal present at the switching output of the toggle switch 10 and the second signal generated by the local oscillator 15 and divided into two signal parts phase-shifted by 90° by a quadrature phase generator (corresponding real part and imaginary part) may then be mixed in a downward mixer 12' in the manner previously described with respect to FIGS. 1 through 4. The complex-valued signals thus mixed are bandpass-filtered in analog form via analog bandpass filters 17 and 18 (also depicted herein), and then digitalized in A/D converters 13', 13". The signal parts are then digitally further processed in the signal processor 14 in the above described manner in order to extract the data. In this figure, it is readily apparent that the analog control signal, when it is generated by a corresponding switching of the position of the toggle switch 10, also passes the bandpass filters 17 and 18 and is thereby bandpass-filtered. With this measure, not necessarily required for implementing the method according to the invention, it is possible to achieve an even better suppression of disruptive influences.

The method according to the invention illustrated here in the figures once again has the particular advantage that because a control signal is digitally correlated as a high frequency signal with a data signal obtained by mixing the response signal of the sensor with the reference signal, which is likewise a high frequency signal, and in combination with the bandpass filtering of both the analog data signal and the digital signals, digital data signal and digital control signal parasitic effects, as they occur during the wireless data interrogation using high frequency technology, are compensated for and, thus, the accuracy of the measured value determination is significantly increased.

LIST OF REFERENCE NUMERALS

1,1' interrogation device
2 frequency source
3 local oscillator
4,4' upward mixer
5 power splitter
6 signal line
7 toggle switch
8 transceiver antenna
9 signal line
10 toggle switch
11 signal line
12,12' downward mixer
13, 13', 13" A/D converter
14 signal processor
15 local oscillator
16 quadrature phase generator
17 analog bandpass filter
18 analog bandpass filter
19 quadrature phase generator

The invention claimed is:

1. A method for wireless interrogation of data comprising:
providing a frequency reference;
generating a first high frequency signal of a first frequency from the frequency reference;
sending the first high frequency signal of a first frequency to a delay-line surface wave component (SAW);
exciting the SAW;
transmitting a response signal from the excited SAW;
receiving the response signal and mixing the received response signal with a reference signal in a mixer for generating a data signal;
evaluating the generated data signal for the purpose of extracting data;
generating a second high frequency signal generated from the frequency reference; wherein the second high frequency signal is generated at a second frequency differing from the first frequency;
using the second high frequency signal as the reference signal;
generating a control signal by mixing the first high frequency signal with the reference signal;
bandpass-filtering the data signal in analog form;
converting the bandpass-filtered data signal and the control signal to a digital data signal and a digital control signal, respectively;
bandpass-filtering each of the digital control signal and the digital data signal in digital form;
correlating in a digital signal processing, the digital data signal and the digital control signal to form a result signal such that a digital coherence is achieved between the digital data signal and the digital control signal; and
obtaining raw data containing the data from the result signal.

2. The method according to claim 1, wherein the mixing of the first high frequency signal with the reference signal for generating the control signal takes place in the mixer, and wherein the response signal is also mixed with the reference signal to obtain the data signal.

3. The method according to claim 1, wherein the control signal is bandpass-filtered in analog form before being converted to the digital control signal.

4. The method according to claim 1, wherein the data signal and the control signal are digitalized one after the other via one and the same A/D converter and are fed to the digital signal processing, wherein in the digital signal processing, at least one of the digital signals is buffered.

5. The method according to claim 1, wherein a same antenna is used for sending the first high frequency signal and receiving the response signal, and wherein the sending and receiving occur one after the other and the antenna is switched accordingly.

6. The method as defined in claim 1, wherein the wireless interrogation of data comprises interrogating data from a surface wave component.

7. The method according to claim 1, wherein for interrogating a piece of data, a series of first high frequency signals is transmitted in succession, wherein the first frequency of the first high frequency signals is modified for each transmission process or after a predefined number of transmission processes, and wherein for the control signal for evaluating a data signal generated with a response signal obtained in the respective transmission process, the first high frequency signal at the first frequency is instantaneously adjusted for the transmission process and is mixed with the reference signal.

8. The method according to claim 7, wherein parallel to a change of the first frequency of the first high frequency signal in the series of the first high frequency signals, the second frequency of the second high frequency signals is also changed such that a bandpass filter having a fixed characteristic is used for the analog bandpass-filtering of the analog data signal.

9. A method for wireless interrogation of data comprising:
sending a first high frequency signal of a first frequency to a delay-line surface wave component (SAW);
exciting the SAW;
transmitting a response signal from the excited SAW;
receiving the response signal and mixing the received response signal with a reference signal in a mixer for generating a data signal;
evaluating the generated data signal for the purpose of extracting data;
generating a second high frequency signal generated from a same frequency reference as the first high frequency signal; wherein the second high frequency signal is generated at a second frequency differing from the first frequency;
using the second high frequency signal as the reference signal;
generating a control signal by mixing the first high frequency signal with the reference signal;
bandpass-filtering the data signal in analog form;
converting the bandpass-filtered data signal and the control signal to a digital signal and a digital control signal, respectively;
bandpass-filtering each of the digital control signal and the digital data signal in digital form;
correlating in a digital signal processing, the digital data signal and the digital control signal to form a result signal such that a digital coherence is achieved between the digital data signal and the digital control signal; and
obtaining raw data containing the data from the result signal;
wherein for interrogating a piece of data, a series of first high frequency signals is transmitted in succession, wherein the first frequency of the first high frequency signals is modified for each transmission process or after a predefined number of transmission processes, and wherein for the control signal for evaluating a data signal generated with a response signal obtained in the respective transmission process, the first high frequency signal at the first frequency is instantaneously adjusted for the transmission process and is mixed with the reference signal.

10. The method according to claim 9, wherein parallel to a change of the first frequency of the first high frequency signal in the series of the first high frequency signals, the second frequency of the second high frequency signals is also changed such that a bandpass filter having a fixed characteristic is used for the analog bandpass-filtering of the analog data signal.

11. An interrogation device for wireless interrogation of data from a delay-line surface wave component (SAW), comprising:
a device for producing a frequency reference;
a device that generates a first high frequency signal from the frequency reference and at a first frequency;
a transmission antenna connectable to the device, wherein said transmission antenna generates the first high frequency signal;
a receiving antenna;
a mixer having a first signal input and a second signal input, as well as a signal output;
an A/D converter connected to the signal output;
a signal processor connected to the A/D converter;
a device that generates a reference signal in the form of a second high frequency signal from the frequency reference, wherein the second high frequency is generated at a second frequency differing from the first frequency;
wherein the first signal input of the mixer is connected to the device for generating the reference signal, and wherein the second signal input is selectively connectable to the receiving antenna or to the device for generating the first high frequency signal; and
wherein the signal processor is specially programmed to store signals in the form of a digital data signal and in the form of a digital control signal digitalized with the A/D converter and to correlate these digital signals such that a digital coherence is established between the digital data signal and the digital control signal, and wherein the signal processor is further specially programmed to read out data of the SAW, and wherein the signal processor reads out data once the digital coherence of the signals thus correlated is established based on a digital mixed signal thus obtained.

12. The interrogation device according to claim 11, further comprising a power splitter connected to the device for generating the first high frequency signal, wherein the power splitter includes two outputs, a first of which is connectable to the transmission antenna, a second of which is connectable to the second signal input of the mixer.

13. The interrogation device according to claim 11, wherein the transmission antenna and the receiving antenna are formed by a single transceiver antenna which is selectively connectable via a switch to the device for generating the first high frequency signal or to the second signal input of the mixer.

14. The interrogation device according to claim 11, wherein the interrogation device further comprises a timing element, and wherein the timing element presets a recording time of the control signal identically to a receiving time of the sensor signal.

* * * * *

UNITED STATES PATENT AND TRADEMARK OFFICE
CERTIFICATE OF CORRECTION

PATENT NO. : 10,735,168 B2  
APPLICATION NO. : 15/350613  
DATED : August 4, 2020  
INVENTOR(S) : Chaabane et al.

Page 1 of 1

It is certified that error appears in the above-identified patent and that said Letters Patent is hereby corrected as shown below:

On the Title Page

Item (73), Change Assignee from "Pro-Micron GmbH & Co. KG". to -- Pro-Micron GmbH --.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*